US007220368B2

(12) United States Patent
Ban

(10) Patent No.: US 7,220,368 B2
(45) **Date of Patent: *May 22, 2007**

(54) NEMATIC LIQUID CRYSTAL COMPOSITION

(75) Inventor: Byeong-Seob Ban, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/433,320

(22) Filed: May 12, 2006

(65) Prior Publication Data

US 2006/0202165 A1 Sep. 14, 2006

Related U.S. Application Data

(63) Continuation of application No. 10/881,081, filed on Jun. 30, 2004, now Pat. No. 7,063,805.

(30) Foreign Application Priority Data

Jul. 9, 2003 (KR) .............................. 2003-46513

(51) Int. Cl.
*C09K 19/30* (2006.01)
*C09K 19/12* (2006.01)
*C09K 19/20* (2006.01)

(52) U.S. Cl. .......................... 252/299.63; 252/299.66; 252/299.67

(58) Field of Classification Search ................. 428/1.1; 252/299.01, 299.63, 299.66, 299.67
See application file for complete search history.

(56) References Cited

U.S. PATENT DOCUMENTS

| | | | | |
|---|---|---|---|---|
| 7,045,176 | B2 * | 5/2006 | Yun et al. | 428/1.1 |
| 7,063,805 | B2 * | 6/2006 | Ban | 252/299.63 |
| 2004/0119051 | A1 * | 6/2004 | Yun et al. | 252/299.63 |

OTHER PUBLICATIONS

English translation by computer for JP 2002-012871,□□http://www4.ipdl.ncipi.go.jp/Tokujitu/PAJdetail.ipdl?N0000=60&N0120=01&N2001=2&N3001=2002-012871.*

* cited by examiner

*Primary Examiner*—Shean C Wu
(74) *Attorney, Agent, or Firm*—F. Chau & Associates, LLC

(57) ABSTRACT

A nematic liquid crystal composition includes a compound of formula (1) and a host mixture:

(1)

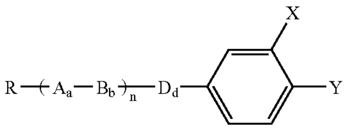

wherein 'R' is chosen from $C_nH_{2n+1}O$, $C_nH_{2n+1}$, $C_nH_{2n+1}S$ or $C_nH_{2n-1}$; 'n' is an integer of 1 to 15; 'A' is

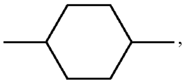 ,
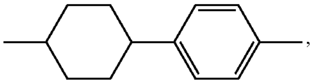 ,
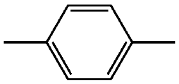 or
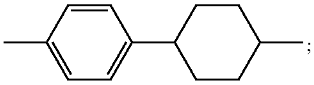 ;

'a' is 0 or 1; 'B' is —$CH_2CH_2$—, —C═C—, —C≡C— or

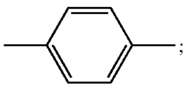

;

b' is 0 or 1; 'D' is

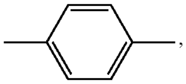

, 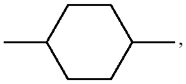 ,
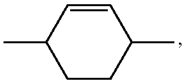 ,
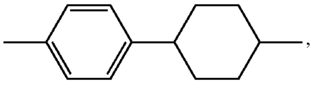 ,
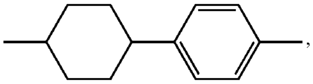 ,

—$CH_2CH_2$—, —C═C— or —C≡C—; 'd' is 0 or 1; 'X' is H, F, Cl, Br, NCS or CN; and 'Y' is from NCS, SCN or F. A liquid crystal display apparatus employing the nematic liquid crystal composition has a high response speed and a high phase transition temperature. In addition, the nematic liquid crystal composition has an augmented birefringence and a dielectric anisotropy. The liquid crystal display apparatus using the nematic liquid crystal composition may have an enhanced brightness.

4 Claims, No Drawings

NEMATIC LIQUID CRYSTAL COMPOSITION

CROSS-REFERENCE TO RELATED APPLICATIONS

This application is a Continuation of U.S. application Ser. No. 10/881,081, filed on Jun. 30, 2004 now U.S. Pat. No. 7,063,805, the disclosure of which is hereby incorporated by reference herein in its entirety.

BACKGROUND OF THE INVENTION

1. Field of the Invention

The present invention relates to a nematic liquid crystal composition. More particularly, the present invention relates to a nematic liquid crystal composition having a high phase transition temperature and a high response speed.

2. Description of the Related Art

Recently, an information processing technology and a technology of manufacturing information processing devices have been developed. With developments of the technologies, a massive data may be processed in short time. Thus, a display device that displays the processed data has been introduced in various fields.

With a rapid development of a semiconductor technology, electronic devices are demanded to be small in size, light in weight and low power consumptive. In recent years, a flat panel display apparatus with the above characteristics is in strong demand.

In particular, demands for a liquid crystal apparatus device have increased since the liquid crystal display device requires low power consumption and low operation voltage while exhibiting an excellent display quality as bright as a display apparatus using a cathode ray tube. The liquid crystal display apparatus is widely used in various electronic devices.

The liquid crystal display apparatus may be applied to display devices such as a notebook computer, a computer monitor or a television set. As for the television set, a twisted nematic (TN) liquid crystal display apparatus, an in-plane switching (IPS) liquid crystal display apparatus or a vertical alignment (VA) mode liquid crystal display apparatus may be used. The IPS liquid crystal display apparatus and the VA mode liquid crystal display apparatus have a wide viewing angle, but a slow response speed. Thus, the IPS liquid crystal display apparatus and the VA mode liquid crystal display apparatus may not be suitable for displaying a moving image. In addition, manufacturing yields of the apparatuses are low and manufacturing costs of the apparatuses are high.

Alternatively, the TN liquid crystal display apparatus has a high manufacturing yield and a low manufacturing cost. The TN liquid crystal display apparatus, however, has a narrow viewing angle and a low response speed.

Liquid crystal requires a low viscosity for a high response speed, a high dielectric anisotropy for low operation voltage, and a nematic phase over a wide range of temperature. Birefringence of the liquid crystal is preferably at least about 0.20 at about 25° C.

Generally, each of the TN liquid crystal display apparatus, the IPS liquid crystal display apparatus and the VA mode liquid crystal display apparatus has a response speed of about 20 ms to about 30 ms. An increase of the response speed in the above apparatuses, however, is required for displaying a moving image.

A viewing angle of a liquid crystal display apparatus has been improved by use of a compensation film. The response speed, however, primarily depends on characteristics of the liquid crystal. Thus, a novel liquid crystal composition that exhibits a high response speed is required.

To display an image in the liquid crystal display apparatus as brightly as a display apparatus using the cathode ray tube, a backlight assembly is used as a light supply source. The backlight assembly, however, may generate a heat in the lamp tube of the backlight assembly.

Generally, a liquid crystal display apparatus has two substrates and a liquid crystal layer interposed between the two substrates. Electric power from an external power supply is applied to electrodes on the substrates. The liquid crystal transmits or blocks an external light generated from the backlight assembly to display data as an image. The backlight assembly is disposed near the liquid crystal. Thus, the heat generated from the backlight assembly may be transferred to the liquid crystal.

Accordingly, a liquid crystal composition with a high phase transition temperature is required. Currently used nematic liquid crystal compositions for a TN liquid crystal display apparatus, an IPS liquid crystal display apparatus or a VA mode liquid crystal display apparatus may have a phase transition temperature of about 70° C. to about 80° C., which is not preferable for a display apparatus requiring a high brightness.

SUMMARY OF THE INVENTION

Accordingly, the present invention is provided to substantially obviate one or more problems due to limitations and disadvantages of the related art.

The present invention provides a nematic liquid crystal composition with a high response speed and a high phase transition temperature.

According to an exemplary composition of the present invention, a nematic liquid crystal composition including a compound of formula (1) and a host mixture is provided:

(1)

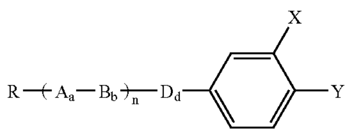

wherein R is $C_nH_{2n+1}O$, $C_nH_{2n+1}$, $C_nH_{2n+1}S$ or $C_nH_{2n-1}$; n is an integer of 1 to 15 ; 'A' is

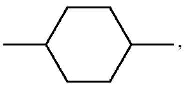,

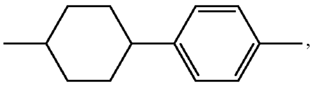,

 or

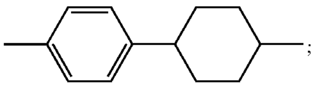;

'a' is 0 or 1; 'B' is $CH_2CH_2$—, —C═C—, —C≡C— or

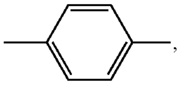, 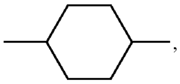, 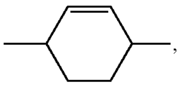,

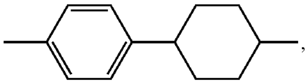,

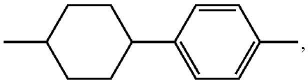,

'b' is 0 or 1; 'D' is

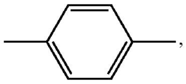, 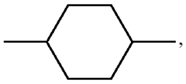,

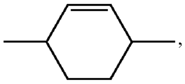,

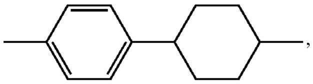,

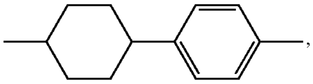,

—$CH_2CH_2$—, —C═C— or —C≡C—; 'd' is 0 or 1; 'X' is H, F, Cl, Br, NCS or CN; and 'Y' is NCS, SCN or F.

The nematic liquid crystal composition has relatively high phase transition temperature and response speed. In addition, the nematic liquid crystal composition has an augmented birefringence and a dielectric anisotropy. The liquid crystal display apparatus using the nematic liquid crystal composition may have an enhanced brightness.

DESCRIPTION OF THE INVENTION

Hereinafter, the present invention will be described in detail.

A nematic liquid crystal composition according to the present invention includes a compound of formula (1) and a host mixture.

The compound in the nematic liquid crystal composition is represented by the formula (1):

(1)

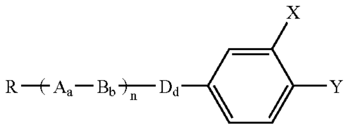

wherein 'R' is $C_nH_{2n+1}O$, $C_nH_{2n+1}$, $C_nH_{2n+1}S$ or $C_nH_{2n-1}$; 'n' is an integer of 1 to 15; 'A' is

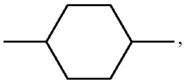,

-continued

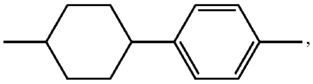,

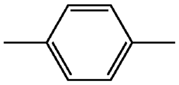 or

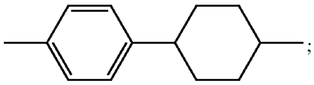;

'a' is 0 or 1; 'B' is $CH_2CH_2$—, —C═C—, —C≡C— or

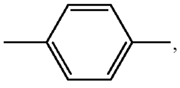, 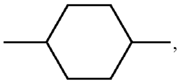, 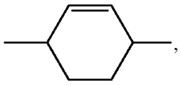,

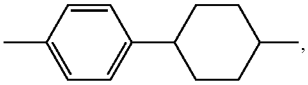,

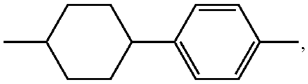,

'b' is 0 or 1; 'D' is

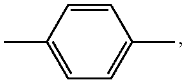, 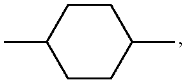,

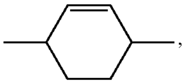,

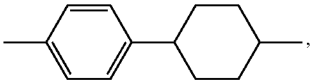,

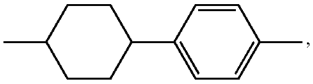,

—$CH_2CH_2$—, —C═C— or —C≡C—; 'd' is 0 or 1; 'X' is H, F, Cl, Br, NCS or CN; and 'Y' is NCS, SCN or F.

When the contents of the nematic liquid crystal composition include less than about 1% by weight of the compound of formula (1), a desired effect of the nematic liquid crystal composition may be not obtained. When the contents of the nematic liquid crystal composition exceed about 90% by weight of the compound of formula (1), the nematic liquid crystal composition may not satisfy a characteristic of high response speed for liquid crystal. Therefore, the nematic liquid crystal composition includes preferably about 1% to about 90% by weight of the compound of formula (1) and about 10% to about 99% by weight of a host mixture.

As mentioned above, the nematic liquid crystal composition includes the compound of formula (1) and the host mixture. The host mixture includes compounds of formulae (2) to (15):

(2)
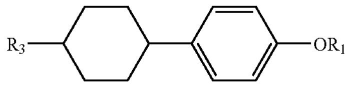
(3)
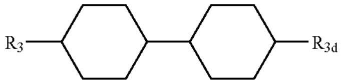
(4)
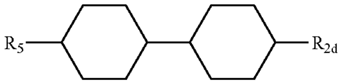
(5)
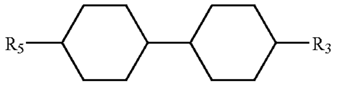
(6)
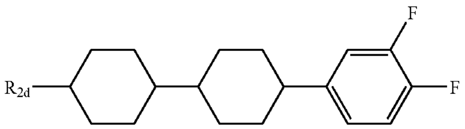
(7)
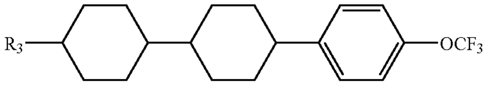
(8)
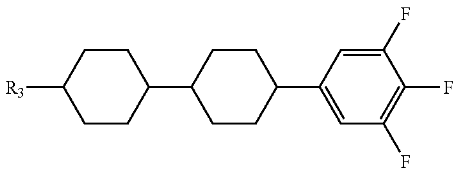
(9)
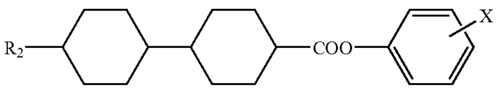
(10)
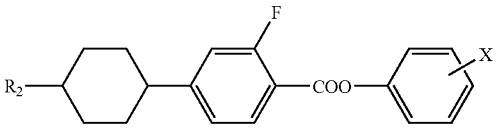
(11)
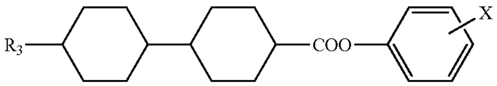
(12)
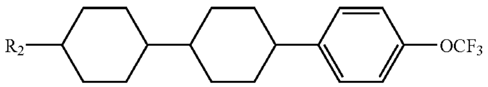
(13)
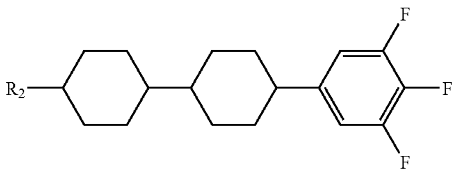
(14)
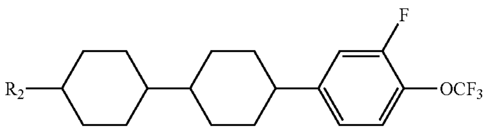
-continued
(15)
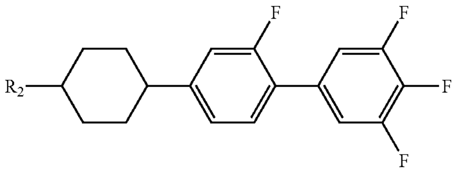
wherein $R_1$ is methyl; $R_2$ is ethyl; $R_{2d}$ is vinyl; $R_3$ is propyl; $R_{3d}$ is allyl; and $R_5$ is pentyl.
Alternatively, the host mixture includes compounds of formulae (2) to (8) and (12) to (18):
(2)
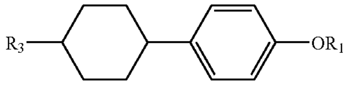
(3)
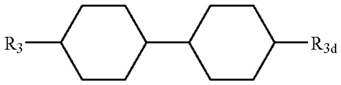
(4)
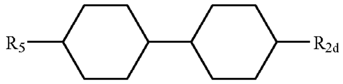
(5)
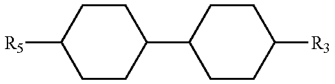
(6)
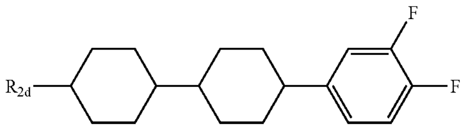
(7)
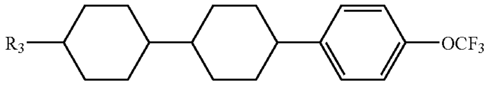
(8)
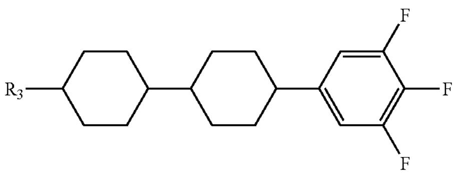
(12)
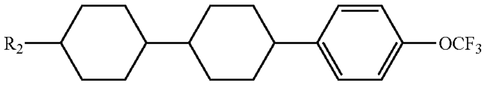
(13)
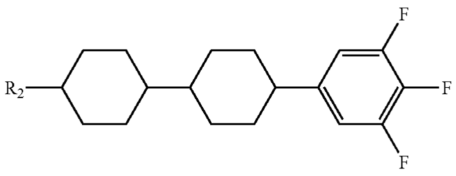
(14)
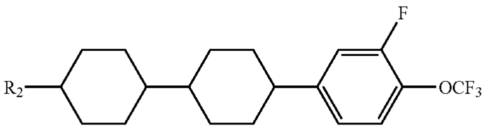

-continued (15)

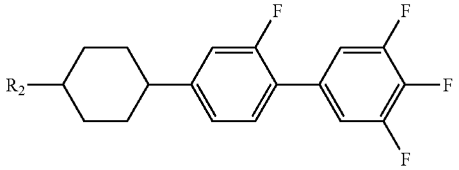

(16)

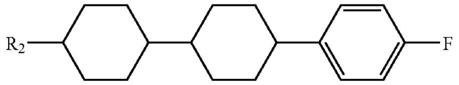

(17)

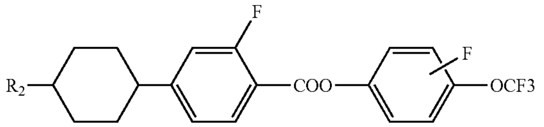

(18)

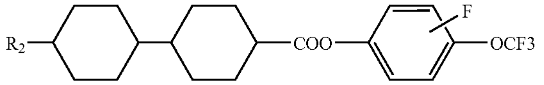

wherein $R_1$ is methyl; $R_2$ is ethyl; $R_{2d}$ is vinyl; $R_3$ is propyl; $R_{3d}$ is allyl; and $R_5$ is pentyl.

Hereinafter, the present invention will be described in detail with reference to the following examples. The examples are given solely for the purpose of illustration and are not to be construed as limitations of the present invention, as many variations thereof are possible without departing from the spirit and scope of the invention.

A first host mixture used in Examples includes about 6.6% by weight of the compound of formula (2), about 5.4% by weight of the compound of formula (3), about 20.8% by weight of the compound of formula (4), about 4.1% by weight of the compound of formula (5), about 11.07% by weight of the compound of formula (6), about 2.5% by weight of the compound of formula (7), about 2.5% by weight of the compound of formula (8), about 3.4% by weight of the compound of formula (9), about 9.0% by weight of the compound of formula (10), about 9.4% by weight of the compound of formula (11), about 8.66% by weight of the compound of formula (12), about 8.0% by weight of the compound of formula (13), about 3.6% by weight of the compound of formula (14) and about 4.97% by weight of the compound of formula (15).

In examples, a phase transition temperature (Tni) indicates a temperature at which liquid crystal is changed from a liquid crystal phase to an isotropic liquid phase.

EXAMPLE 1

About 7% by weight of the compound of formula (1-1) and about 93% of the first host compound were mixed to prepare a liquid crystal composition.

(1-1)

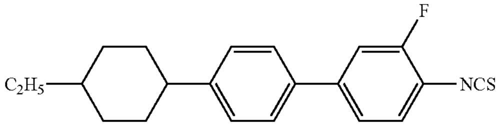

The liquid crystal composition had a phase transition temperature (Tni) of about 87.9° C. The liquid crystal composition has a birefringence (Δn) of about 0.0909 and a dielectric anisotropy (Δϵ) of about 6.1 at about 20° C .

The compound of formula (1-1) had a melting point of about 97.8° C. and a phase transition temperature (Tni) of about 192.5° C. The compound of formula (1-1) had a birefringence (Δn) of about 0.302 and a dielectric anisotropy (Δϵ) of about 12.

EXAMPLE 2

About 17% by weight of the compound of formula (1-1) and about 83% of the first host compound were mixed to prepare a liquid crystal composition.

The liquid crystal composition had a phase transition temperature (Tni) of about 96° C. The liquid crystal composition had a birefringence (Δn) of about 0.115 and a dielectric anisotropy (Δϵ) of about 6.68 at about 20° C.

The compound of formula (1-1) had a melting point of about 97.8° C. and a phase transition temperature (Tni) of about 192.5° C. The compound of formula (1-1) had a birefringence (Δn) of about 0.302 and a dielectric anisotropy (Δϵ) of about 12.

EXAMPLE 3

About 30% by weight of the compound of formula (1-1) and about 70% of the first host compound were mixed to prepare a liquid crystal composition.

The liquid crystal composition had a phase transition temperature (Tni) of about 113.8° C. The liquid crystal composition had a birefringence (Δn) of about 0.1431 and a dielectric anisotropy (Δϵ) of about 7.5 at about 20° C .

The compound of formula (1-1) had a melting point of about 97.8° C. and a phase transition temperature (Tni) of about 192.5° C. The compound of formula (1-1) had a birefringence (Δn) of 0.302 and a dielectric anisotropy (Δϵ) of about 12.

EXAMPLE 4

About 7% by weight of a compound of formula (1-2) and about 93% of the first host compound were mixed to prepare a liquid crystal composition.

(1-2)

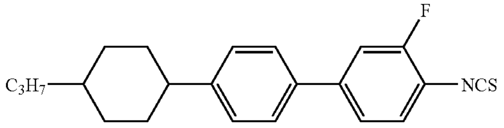

The liquid crystal composition had a phase transition temperature (Tni) of about 90.3° C. The liquid crystal composition had a birefringence (Δn) of about 0.0899 and a dielectric anisotropy (Δϵ) of about 6.3 at about 20° C.

The compound of formula (1-2) had a melting point of about 109.7° C. and a phase transition temperature (Tni) of about 227.6° C. The compound of formula (1-1) had a birefringence (Δn) of about 0.288 and a dielectric anisotropy (Δϵ) of about 14.7.

EXAMPLE 5

About 17% by weight of the compound of formula (1-2) and about 83% of the first host compound were mixed to prepare a liquid crystal composition.

The liquid crystal composition had a phase transition temperature (Tni) of about 103.5° C. The liquid crystal composition had a birefringence (Δn) of about 0.115 and a dielectric anisotropy (Δϵ) of about 7.14 at about 20° C.

The compound of formula (1-2) had a melting point of about 109.7° C. and a phase transition temperature (Tni) of about 227.6° C. The compound of formula (1-1) had a birefringence (Δn) of about 0.288 and a dielectric anisotropy (Δϵ) of about 14.7.

EXAMPLE 6

About 30% by weight of the compound of formula (1-2) and about 70% of the first host compound were mixed to prepare a liquid crystal composition.

The liquid crystal composition had a phase transition temperature (Tni) of about 124.3° C. The liquid crystal composition had a birefringence (Δn) of about 0.1389 and a dielectric anisotropy (Δϵ) of about 8.4 at about 20° C.

The compound of formula (1-2) had a melting point of about 109.7° C. and a phase transition temperature (Tni) of about 227.6° C. The compound of formula (1-1) had a birefringence (Δn) of about 0.288 and a dielectric anisotropy (Δϵ) of about 14.7.

EXAMPLE 7

About 17.7% by weight of a compound of formula (1-3) and about 82.3% of the first host compound were mixed to prepare a liquid crystal composition.

(1-3)

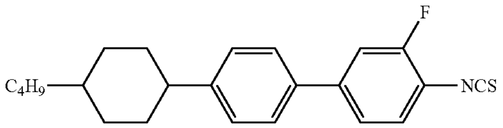

The liquid crystal composition had a phase transition temperature (Tni) of about 101.5° C. The liquid crystal composition had a birefringence (Δn) of about 0.111 and a dielectric anisotropy (Δϵ) of about 6.65 at about 20° C.

The compound of formula (1-3) had a melting point of about 87.4° C. and a phase transition temperature Tni of about 215° C. The compound of formula (1-3) had a birefringence (Δn) of about 0.274 and a dielectric anisotropy (Δϵ) of about 11.5.

EXAMPLE 8

About 7% by weight of a compound of formula (1-4) and about 93% of the first host compound were mixed to prepare a liquid crystal composition.

(1-4)

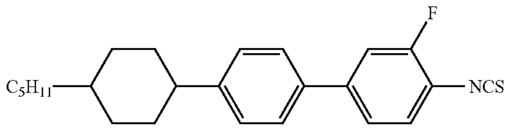

The liquid crystal composition had a phase transition temperature (Tni) of about 89.5° C. The liquid crystal composition had a birefringence (Δn) of about 0.0899 and a dielectric anisotropy (Δϵ) of about 6.1 at about 20° C.

The compound of formula (1-4) had a melting point of about 90° C. and a phase transition temperature (Tni) of about 216° C. The compound of formula (1-4) had a birefringence (Δn) of about 0.274 and a dielectric anisotropy (Δϵ) of about 12.1.

EXAMPLE 9

About 17% by weight of the compound of formula (1-4) and about 83% of the first host compound were mixed to prepare a liquid crystal composition.

The liquid crystal composition had a phase transition temperature (Tni) of about 102° C. The liquid crystal composition had a birefringence (Δn) of about 0.111 and a dielectric anisotropy (Δϵ) of about 6.41 at about 20° C.

The compound of formula (1-4) had a melting point of about 90° C. and a phase transition temperature (Tni) of about 216° C. The compound of formula (1-4) had a birefringence (Δn) of about 0.274 and a dielectric anisotropy (Δϵ) of about 12.1.

EXAMPLE 10

About 30% by weight of the compound of formula (1-4) and about 70% of the first host compound were mixed to prepare a liquid crystal composition.

The liquid crystal composition had a phase transition temperature (Tni) of about 120.8° C. The liquid crystal composition had a birefringence (Δn) of about 0.1347 and a dielectric anisotropy (Δϵ) of about 7.6 at about 20° C.

The compound of formula (1-4) had a melting point of about 90° C. and a phase transition temperature (Tni) of about 216° C. The compound of formula (1-4) had a birefringence (Δn) of about 0.274 and a dielectric anisotropy (Δϵ) of about 12.1.

EXAMPLE 11

About 6.3% by weight of the compound of formula (2), about 5.2% by weight of the compound of formula (3), about 20.1% by weight of the compound of formula (4), about 4.4% by weight of the compound of formula (5), about 6.8% by weight of the compound of formula (13), about 2.4% by weight of the compound of formula (8), about 2.9% by weight of the compound of formula (15), about 3.3% by weight of the compound of formula (16), about 8.7% by weight of the compound of formula (17), about 9.1% by weight of the compound of formula (18), about 2.9% by weight of the compound of formula (7), about 7.2% by weight of the compound of formula (12), about 2.3% by weight of the compound of formula (14), about 10.2% by weight of the compound of formula (6), about 4% by weight of the compound of formula (1-1) and about 4.2% by weight of the compound of formula (1-2) were mixed to prepare a liquid crystal composition.

The liquid crystal composition had a phase transition temperature (Tni) of about 89° C. The liquid crystal composition had a birefringence (Δn) of about 0.094 and a dielectric anisotropy (Δϵ) of about 6.3 at about 20° C.

COMPARATIVE EXAMPLE 1

A liquid crystal composition including the first host mixture was prepared. The liquid crystal composition had a melting point of about −30° C. and a phase transition temperature (Tni) of about 80° C. The liquid crystal composition had a birefringence (Δn) of about 0.075 and a dielectric anisotropy (Δϵ) of about 5.63.

Evaluating Characteristics of Liquid Crystal Compositions

Liquid crystal display apparatuses were manufactured using the liquid crystal compositions of Comparative Example 1, Examples 2, 5, 7, 9 and 11. A response speed, a threshold voltage, a voltage holding ratio and a cell gap were evaluated for each liquid crystal display apparatus. The results are shown in Table 1 below.

TABLE 1

| | Response speed (ms) | Threshold voltage (V) | Voltage holding ratio (%) | Cell gap (μm) |
|---|---|---|---|---|
| Comparative Example 1 | 16.2 | — | — | 4.6 |
| Example 2 | 9.0 | 1.5 | 99.4 | 3.77 |
| Example 5 | 9.4 | 1.4 | 99.0 | 3.7 |
| Example 7 | 9.9 | 1.5 | 99.1 | 3.7 |
| Example 9 | 11.0 | 1.4 | 99.1 | 3.7 |
| Example 11 | 12.0 | 1.5 | 99.8 | 4.0 |

Referring to Table 1, the threshold voltages are not very different between Examples. Voltage holding ratios are also not very different from each other between Examples. The liquid crystal composition of Example 2 shows the fastest response speed. The liquid crystal composition of Comparative Example 1 includes a conventional liquid crystal composition. As shown in Table 1, the liquid crystal compositions of Examples 2, 5, 7, 9 and 11 give response speeds at least 4 ms faster than the conventional liquid crystal composition.

The liquid crystal composition of Example 2 has the phase transition temperature (Tni) of about 96° C., which is at least about 15° C. higher than that of Comparative Example 1, i.e., about 80° C.

The compounds of formulae (1-1) to (1-4) have the phase transition temperatures (Tni) of about 190° C. to about 220° C., which are at least twice of that in Comparative Example 1 of about 80° C. The compounds of formulae (1-1) to (1-4) have birefringence of at least about 0.2 that is higher than the conventional liquid crystal composition, and anisotropies of at least about 10, thereby reducing operation voltages.

In Examples 1 to 10, the phase transition temperatures (Tni) of the liquid crystal compositions increase as content of the compound according to the present invention increases.

The compound used in a nematic liquid crystal composition has high birefringence, high phase transition temperature and fast response speed. Thus, the nematic liquid crystal composition may maintain characteristics thereof when the heat generated in the backlight is provided to the liquid crystal composition.

The liquid crystal composition according to the present invention may be used in a twisted nematic liquid crystal display apparatus, a super twisted nematic liquid crystal display apparatus, a thin film transistor twisted nematic liquid crystal display apparatus, an in-plane switching liquid crystal display apparatus and a vertical alignment mode liquid crystal display apparatus.

As described above, the present invention provides a liquid crystal composition including the compound of formula (1):

(1)

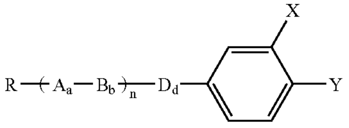

wherein 'R' is $C_nH_{2n+1}O$, $C_nH_{2n+1}$, $C_nH_{2n+1}S$ or $C_nH_{2n-1}$; 'n' is an integer of 1 to 15; 'A' is

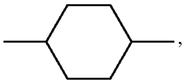
,
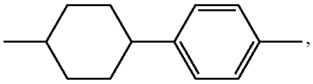
,
or
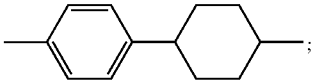
;

'a' is 0 or 1; 'B' is $CH_2CH_2$—, —C═C—, —C≡C— or

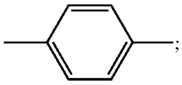
;

'b' is 0 or 1; 'D' is

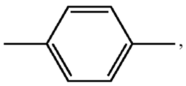
,
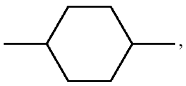
,
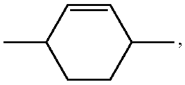
,
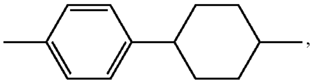
,
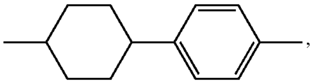
,

—$CH_2CH_2$—, —C═C— or —C≡C—; 'd' is 0 or 1; 'X' is H, F, Cl, Br, NCS or CN; and 'Y' is NCS, SCN or F.

The liquid crystal composition including the compound of formula (1) has a relatively high phase transition temperature and response speed. In addition, a birefringence and a dielectric anisotropy of the liquid crystal composition are increased, thereby providing a liquid crystal display apparatus with high brightness. As a result, a liquid crystal display apparatus having excellent performance may be provided.

What is claimed is:

1. A nematic liquid crystal composition comprising a compound of formula (1) and a host mixture comprising compounds of formula (2) to (7):

(1)

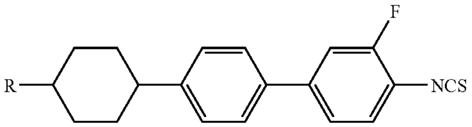

(2)

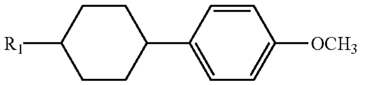

(3)

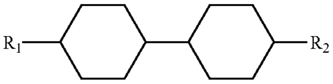

(4)

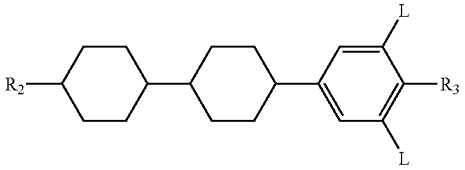

(5)

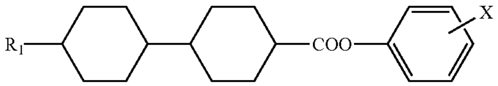

(6)

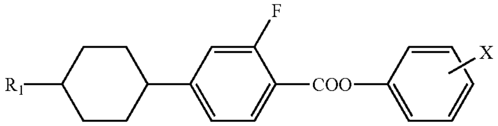

(7)

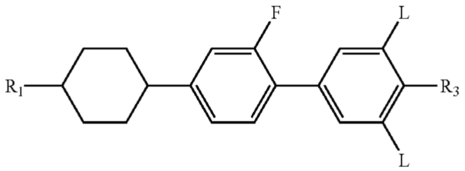

wherein 'R' is any one selected from the group consisting of $C_lH_{2l+1}O$, $C_lH_{2l+1}$ and $C_lH_{2l+1}S$ (wherein l is an integer of 1 to 15), or "R" is $C_mH_{2m-1}$ (wherein m is an is integer of 1 or 3 to 15); X is H, F, Cl , Br, NCS or CN; $R_1$ is $C_nH_{2n+1}$ (wherein n is an integer of 2 to 5); $R_2$ is any one selected from the group consisting of $C_pH_{2p+1}$ (wherein p is an integer of 2 to 5), vinyl and allyl; $R_3$ is F or $OCF_3$; L is H or F.

2. The nematic liquid crystal composition of claim 1, wherein the nematic liquid crystal composition comprises about 1% to about 90% by weight of the compound of formula (1) and about 10% to about 99% by weight of the host mixture.

3. A nematic liquid crystal composition comprising a compound of formula (1) and a host mixture comprising compounds of formula (2) to (8):

(1)

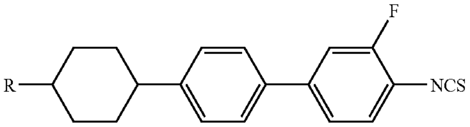

(2)

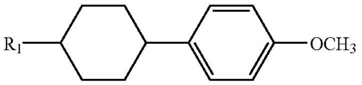

(3)

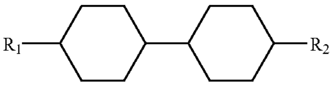

(4)

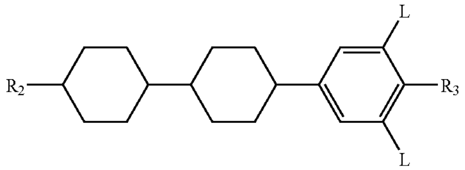

(5)

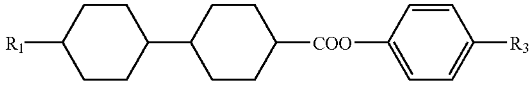

(6)

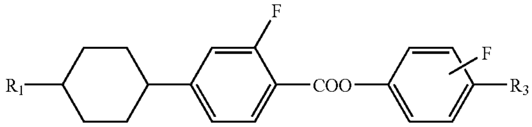

(7)

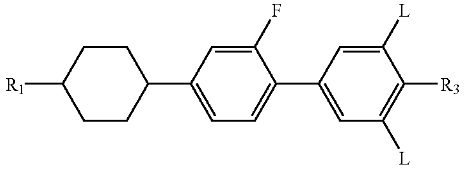

(8)

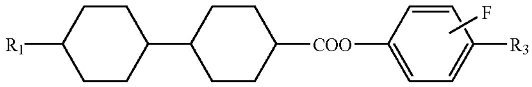

wherein 'R' is any one selected from the group consisting of $C_lH_{2l+1}O$, $C_lH_{2l+1}$ and $C_lH_{2l+1}S$ (wherein l is an integer of 1 to 15), or "R" is $C_mH_{2m-1}$ (wherein m is an integer of or 1 or 3 to 15); X is H, F, Cl, Br, NCS or CN; $R_1$ is $C_nH_{2n+1}$ (wherein n is an integer of 2 to 5); $R_2$ is any one selected from the group consisting of $C_pH_{2p+1}$ (wherein p is an integer of 2 to 5), vinyl and allyl; $R_3$ is F or $OCF_3$; L is H or F.

4. The nematic liquid crystal composition of claim 3, wherein the nematic liquid crystal composition comprises about 1% to about 90% by weight of the compound of formula (1) and about 10% to about 99% by weight of the host mixture.

* * * * *